United States Patent
Karaoguz

(10) Patent No.: US 9,386,544 B2
(45) Date of Patent: Jul. 5, 2016

(54) USING LOCATION INFORMATION TO CONTROL TRANSMISSION SIGNAL LEVELS OF WIRELESS DEVICES

(71) Applicant: BROADCOM CORPORATION, Irvine, CA (US)

(72) Inventor: Jeyhan Karaoguz, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 0 days.

(21) Appl. No.: 13/781,370

(22) Filed: Feb. 28, 2013

(65) Prior Publication Data

US 2013/0178253 A1    Jul. 11, 2013

Related U.S. Application Data

(63) Continuation of application No. 10/314,292, filed on Dec. 9, 2002, now abandoned.

(60) Provisional application No. 60/409,938, filed on Sep. 12, 2002.

(51) Int. Cl.
*H04W 52/28* (2009.01)
*H04W 52/02* (2009.01)

(52) U.S. Cl.
CPC ........ *H04W 52/283* (2013.01); *H04W 52/0209* (2013.01)

(58) Field of Classification Search
CPC ................ H04W 52/283; H04W 52/0209
USPC ................ 455/404.2, 456.1–456.4, 522, 574; 370/318
See application file for complete search history.

(56) References Cited

U.S. PATENT DOCUMENTS

| | | | |
|---|---|---|---|
| 6,446,030 B1 * | 9/2002 | Hoffman et al. ................... 703/1 |
| 6,757,532 B1 * | 6/2004 | Haartsen ............... H04L 1/0002 455/414.1 |
| 6,961,541 B2 * | 11/2005 | Overy et al. .................. 455/41.2 |
| 2002/0075941 A1 * | 6/2002 | Souissi et al. .................. 375/133 |
| 2002/0098852 A1 * | 7/2002 | Goren et al. ................... 455/456 |
| 2002/0102989 A1 * | 8/2002 | Calvert et al. ................. 455/456 |
| 2002/0193072 A1 * | 12/2002 | Alinikula et al. ............... 455/41 |
| 2003/0218539 A1 * | 11/2003 | Hight ....................... 340/539.13 |
| 2003/0224855 A1 * | 12/2003 | Cunningham .................. 463/41 |
| 2004/0166812 A1 * | 8/2004 | Lumelsky ............. H04W 88/02 455/67.11 |

* cited by examiner

*Primary Examiner* — Raymond Dean
(74) *Attorney, Agent, or Firm* — Garlick & Markison; Bruce E. Garlick

(57) ABSTRACT

Provided is adjusting power output levels of a wireless network device by determining a location information of another wireless network device relative to the wireless network device, the location information including distance range. Based on the location information of the another wireless network device, a power output level is adjusted to optimize the power usage of the wireless network device. The power output level is readjusted based upon a sensing a subsequent signal of the another wireless device, and when a signal strength of the subsequent signal compares favorably to a predetermined threshold level, the location information is refreshed, and the power output level of the wireless network device is readjusted based upon the refreshed location information.

20 Claims, 4 Drawing Sheets

USING LOCATION INFORMATION TO CONTROL TRANSMISSION SIGNAL LEVELS OF WIRELESS DEVICES

CROSS REFERENCE TO RELATED APPLICATIONS

The present U.S. Utility Patent Application claims priority pursuant to 35 U.S.C. §120, as a continuation, to the following U.S. Utility Patent Application which is hereby incorporated herein by reference in its entirety and made part of the present U.S. Utility Patent Application for all purposes:

1. U.S. Utility application Ser. No. 10/314,292, entitled "USING LOCATION INFORMATION TO CONTROL TRANSMISSION SIGNAL LEVELS OF WIRELESS DEVICES,", filed Dec. 9, 2002, which claims priority pursuant to 35 U.S.C. §119(e) to the following U.S. Provisional Patent Application which is hereby incorporated herein by reference in its entirety and made part of the present U.S. Utility Patent Application for all purposes:

a. U.S. Provisional Application Ser. No. 60/409,938, entitled "USING LOCATION INFORMATION TO CONTROL POWER OUTPUT IN MASTER DEVICE, WITH THE POWER BEING CONTROLLED BASED ON DETERMINED LOCATION," filed Sep. 12, 2002.

BACKGROUND

1. Field of the Invention

The present invention relates to a method of and an apparatus for using signal-generated location information to control transmission levels of a device in a wireless communication network environment.

2. Description of the Related Art

Currently, cables and wires are predominately used as the communication medium for transferring information such as voice, video, data, etc. from one source to another. For example, cables or wires are commonly used to set up networking infrastructures in business offices, and are also used for personal home computing, and for connecting to the Internet. Generally, the wired devices connected to a wired network can derive its power source from an electrical outlet. Accordingly, wired devices can generally be provided with a steady flow of power so long as the wired device is physically connected through cables or wires to the electrical outlet. Thus, regulating or controlling power output or power consumption may not be a concern for wired devices.

As wireless technology continues to advance and grow, and as wireless services become increasingly convenient, the usage and the popularity of wireless devices will also increase especially in public areas. In contrast to wired devices, wireless devices generally derive its power from power sources such as batteries or battery packs housed within the wireless devices. And because each power source housed within the wireless devices can store only a limited amount of power, it is important to optimize the usage of such power source by minimizing power consumption where possible. Accordingly, one way to help optimize the usage of the power source stored within the wireless device is to control power output of device based on signal-generated location information.

BRIEF DESCRIPTION OF THE DRAWINGS

For proper understanding of the invention, reference should be made to the accompanying drawings, wherein.

DETAILED OF DESCRIPTION OF THE DRAWINGS

Figure 1:
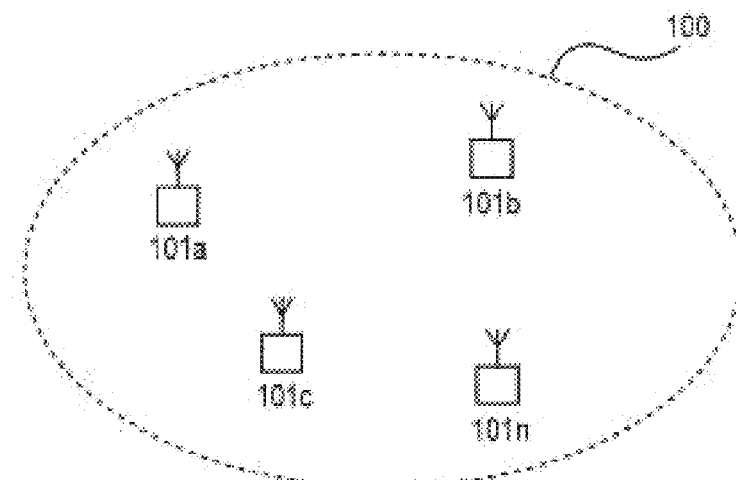
FIG. 1 illustrates one example of a wireless network configuration.

In one example of an embodiment, a method provides for adjusting power output of a device in a wireless network. The method can include activating a power control device, transmitting a first signal from the power control device, and receiving a second signal at the power control device. In addition, the method can include determining a location information on at least one wireless device based on the first signal and the second signal, and adjusting a power output level corresponding to the location information.

In another example of an embodiment, a power control device provides for adjusting power output level of a device in a wireless network. The power control device can have a transmitter configured to transmit a first signal, and a receiver configured to receive a second signal. Furthermore, the power control device can include a processing unit configured to determine a location information on at least one wireless device based on the first signal and the second signal, and a power adjusting unit configured to adjust a power output level corresponding to the a location information.

Additionally, another example of an embodiment is a system for adjusting power output of a wireless device in a wireless network. The system of adjusting power output can include an activating means for activating a power control device, a transmitting means for transmitting a first signal from the power control device, and a receiving means for receiving a second signal at the power control device. Also, the system can include a determining means for determining a location information on at least one wireless device based on the first signal and the second signal, and an adjusting means for adjusting a power output level corresponding to the location information.

In yet another example of an embodiment, a method provides controlling transmission signal levels of a device in a wireless network. The method can include determining a location information of a device, and transmitting a signal for controlling transmission signal levels of the device. The transmission signal levels can cause no transmission interference.

In a further example, a transmission signal level controlling device provides for controlling the transmission signal levels of a device in wireless network. The device can have a determination unit configured to determine a location information of a device, and a transmitting unit configured to transmit a signal to adjust transmission signal levels of the device, wherein the transmission signal levels do not cause transmission interference.

Additionally, another example of an embodiment provides for a system for controlling transmission signal levels of a wireless device in a wireless network. The system can have a determining means for determining a location information of a device, and a transmission means for transmitting a signal for controlling transmission signal levels of the device, wherein the transmission signal levels do not cause transmission interference.

FIG. 1 illustrates one example of a wireless network. The wireless network of FIG. 1 can be an ad hoc network 100 having two or more wireless nodes, stations or devices 101a, 101b, 101c, ... 101n therein (hereinafter, any reference to device(s) shall also include node(s) and/or station(s)). The ad hoc network 100 can be formed on a temporary basis whereby two or more wireless devices can recognize each other and can establish communications with each other. The wireless devices can be any wireless communication device configured to communicate with the Internet and having multimedia capabilities. For example, devices 101a, 101b, 101c, ... 101n can be a smart phone, PDA, a mobile laptop computer, a web-pad, a digital video camera, an automobile equipped with a wireless communication device, or any mobile electronic device. Within the ad hoc wireless network 100, each device can communicate with each other on a peer-to-peer level.

Figure 2:
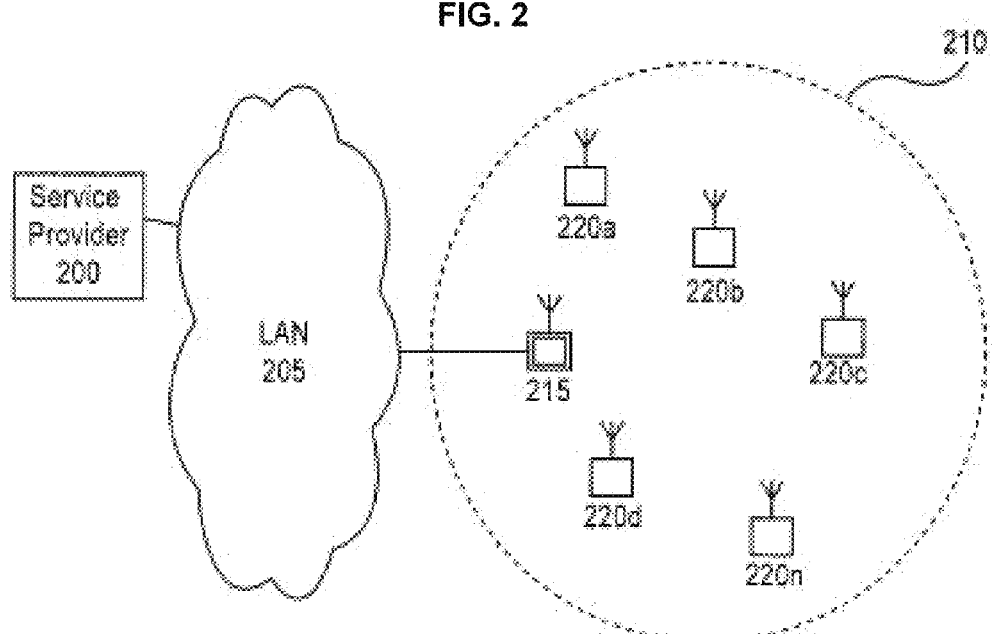
FIG. 2 illustrates another example of a wireless network configuration.

Another example of a wireless network is shown in FIG. 2. FIG. 2 provides a wireless infrastructure network 210 containing an Access Point 215 connected with a LAN 205, such as an Ethernet LAN. In addition, the wireless infrastructure network 210 can contain devices 220a, 220b, 220c, 220d, ... 220n. The Access Point 215 is connected to the LAN 205 by wires or cables and can be formed as part of the wired network infrastructure 205, having at least one service provider 200. One function of the Access Point 215 can be a bridge or a connection between the wireless network 210 and the wired network 205. Accordingly, all communications between the devices 220a, 220b, 220c, 220d, ... 220n or between the devices and the wired network 205 can go through Access Point 215.

The examples of wireless networks as illustrated in FIGS. 1 and 2 can use wireless technologies such as IEEE 802.11, BLUETOOTH™, UWB, etc.

Figure 3:
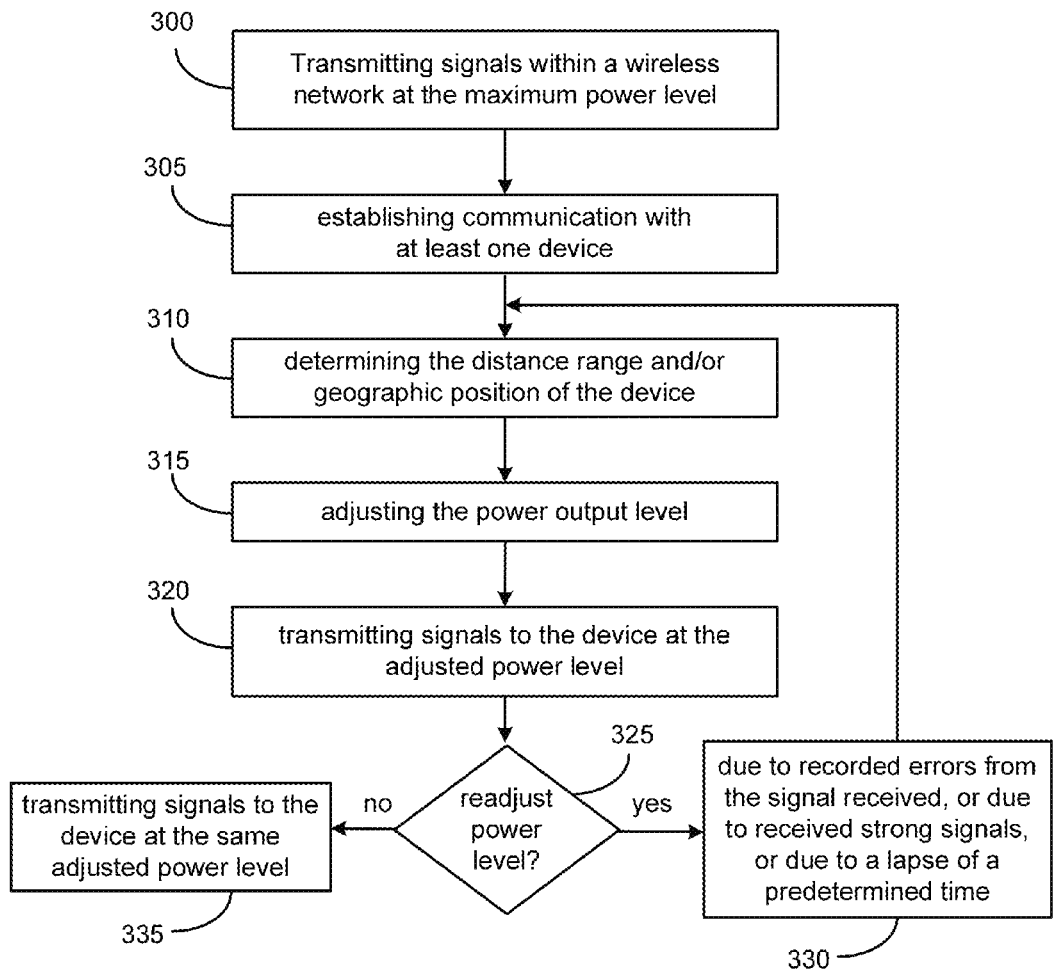
FIG. 3 illustrates a flow chart illustrating one example of a method of controlling power output based on signal-generated location information.

FIG. 3 illustrates one example of a method of controlling power output based on location information of a wireless device in accordance with an embodiment of the present invention. Specifically, FIG. 3 illustrates one example of a method of using location information, such as distance range location information and/or geographic position location information to control power output. The method of the present example can be implemented in hardware, or software, or a combination of both hardware and software.

As mentioned above, a wireless network configuration can contain two or more wireless devices therein. The wireless devices within a wireless network can derive their power from a power source such as a battery housed within the wireless devices. Accordingly, in any wireless device and/or wireless network, regulating power consumption is important since power consumption is directly related to the output power. For instance, when a wireless device does not regulate or control its power output, the device can transmit signals or messages at the same power level whether the receiving device is one meter away or ten meters away. In addition, when there are two wireless devices communicating with each other and the two devices are close enough to each other, this can cause the two devices to unnecessarily blast power to one another. Accordingly, the power consumption of the two devices can be unnecessarily consumed and wasted. Thus, FIG. 3 of the present example illustrates one example of using signal-generated location information to control and regulate power consumption or power output.

A user having a wireless device can enter a geographic area and can activate a power output control device locator within the wireless device to detect, identify and provide a listing of available devices within that geographic area. The power output control device can be integrated with any wireless device and can be, for example, a feature within the wireless device. The module can be switched on or off. By activating the power output control device, the operations of determining location information of available devices can be switched to active mode.

Once the power output control device is activated, the device can detect location information, such as distance range information or geographic position information of available wireless devices. In one example, the power output control device can start by transmitting signals such as UWB signals within a maximum or default distance range at a corresponding maximum or default power output level at step 300. The power output control device can transmit UWB signals in unidirectional mode or omni-directional mode. In addition, the power output control device can transmit signals in short pulses with short duty cycles, and in device-specific bursts. The power output control device can ensure to detect and identify a maximum amount of available devices by initially transmitting signals within a maximum or default distance range at a corresponding maximum or default power output level FIG. 3 further shows the step of receiving signals at step 305. After the transmission of signals either uni-directionally or omni-directionally, the transmitted signals can come into contact with one or more devices within the distance range, and thereafter the signals can reflect back to the power output control device where the reflected signals can be received by the receiver within the wireless device.

Thereafter, the power output control device can monitor and register the timing of the transmission of the signals as well as the timing of the propagation of the signals. For examples, the power output control device can monitor and record the time at which each signal is transmitted. Once the transmitted signals are reflected back and received by the receiver, the power output control device can monitor and record the time at which each signal is received. Based on this information, the power output control device can measure the total time duration for a signal to travel from a transmitter of the power control device to another device, and be reflected back and received by the receiver.

Based on this information and other factors, such as propagation delay, the direction and angle of the signal transmission, the speed at which the signal travels compared to the speed at which light travels, etc., the power output control device can process the information in a range processor to determine the distance range of one or more available device(s) at step 310, and can display or list the information on a display.

In another example, when the power output control device is activated, the power output control device can start by transmitting one or more range message signal(s) to one or more wireless device(s) at step 300. The one or more range message signal(s) can be sent out from a transmitter within the wireless device. In addition, the range message signal(s) can be UWB signals transmitted in short duty cycles at a starting time T, such as T=0. Similar to the example above, the transmission of the range message signals can be unidirectional or omni-directional.

After sending the range message signal(s), one or more available wireless device(s) can receive the range message signal(s) at a time T1. T1 for example, can be the sum of time T, the time of the processing delay $\Delta P$, and the time of the first propagation delay $\Delta T_1$. Thus, one of the available wireless devices can receive the range message signal at time T1, and can be represented as follows:

$$T1 = T + \Delta P + \Delta T_1$$

Once the available wireless device receives the range message signal(s), the available wireless device can process the received range message. The available wireless device can determine whether or not to establish communication with the originating device locator. In the alternative, the available wireless device can automatically respond and attempt to establish communication with the originating device locator. Thereafter, the available wireless device can send a range message acknowledgement signal to the originating device locator at step 305. The range message acknowledgement signal can contain various information about the available device, such as the type of the device, protocol information, job queue information, etc. The available wireless device can send the range message acknowledgement signal at time T2. T2 for example, can be the sum of time T, the time of the processing delay ΔP, the time of the first propagation delay ΔT$_1$, and the turn-around time ΔTA. The turn-around time ΔTA can represent the period of time from the time the available wireless device receives the range message signal to the time said available wireless device transmits the range message acknowledgement signal. Accordingly, time T2 can be represented as the following equation.

$$T2 = T + \Delta P + \Delta T_1 + \Delta TA$$

At time T2, a range message acknowledgement signal can be sent from an available wireless device to the originating power output control device. After the range message acknowledgement signal reaches the originating power output control device, the range message acknowledgement signal can be received by the receiver. Once the range message acknowledgment signal is received, the originating power output control device can determine a total time T$_{Total}$. The total time T$_{Total}$ can be the sum of time T2 and the second propagation time delay ΔT$_2$. Accordingly, the total time T$_{Total}$ can be represented by the following equation.

$$T_{Total} = T2 + \Delta T_2$$

Based on the total time T$_{Total}$, the information embedded within the range message acknowledgement signal, and other factors such as device related delays, the originating power output control device can thereby determine the distance range of the available wireless device at step 310, and can display or list the information on a display.

In yet another example, when the power output control device is activated, the device locator can determine the geographic position of available devices. The power output control device can start by determining the surrounding environment in relation to the detecting device. In other words, when the geographic position locator is activated, the geographic position locator can determine the geographic area surrounding the power output control device through a geographic position unit or other positioning systems such as Global Positioning System.

Suppose for example a user with a wireless device enters a coffee shop in a downtown area of Washington, D.C. Upon entering the coffee shop, the user activates the geographic position locator and selects the geographic position detection mode. The activation and selection of the geographic position locator accesses the geographic position unit wherein the geographic position unit determines that the surrounding environment of the user's wireless device is within the geographic vicinity of 17th Street and L Street in downtown Washington, D.C. Once the surrounding geographic area of the detecting wireless device is determined, the geographic position locator can display a geographic map overlay of the area surround 17th Street and L Street.

Next, the geographic position locator of the present example can determine its own position in relation to the immediate surrounding environment. In other words, and continuing with the example above, the geographic position locator can detect the surrounding geographic environment within the coffee shop in relation to its own position therein. Therefore, the signal-generated geographic position locator can, for example transmit initial detecting pulse signals to detect the interior design or interior layout of the coffee shop. In an alternative example, the signal-generated geographic position locator can establish communication with a Master device within the coffee shop such as an Access Point wherein the Master device can provide the interior design or interior layout instantly.

After determining the immediate surrounding geographic area in relation to its own position, the signal-generated geographic position locator can determine the distance range of available wireless devices by way of the examples mentioned above. The steps of determining the distance range can include the steps transmitting signals within the surrounding environment, receiving one or more second signal(s), and measuring the total propagation time, etc.

Once the signal-generated geographic position locator has identify the available wireless devices and has also determined the distance range of each available wireless devices in relation to its own position, the geographic position locator can thereafter determine the coordinates of each available wireless device based on information such as the distance range information, the surrounding geographic environment information, the global geographic positioning information, and etc. The coordinates of each available wireless device can thereby help to determine the geographic position of each available device at step 310.

Having determined all the necessary information with respect to the geographic position of each available wireless device, the signal-generated geographic position locator can display the geographic location of each available device on a display. In other words, the user can be provided with a display showing a geographic map overlay of the coffee shop, and indicated on the map overlay are the geographic positions of the available wireless devices within the coffee shop in relation to the user's own position therein.

Once the power output control device has determined either the distance range location information and/or the geographic position location information, the power output control device can establish communication with one or more of the identified wireless devices at an adjusted power output level at step 315 of FIG. 3.

Suppose for example that a power output control device is located in a wireless network configuration 210 as shown in FIG. 2. The power output control device can function as an Access Point and can be connected to a wired LAN such as the LAN 205 of FIG. 2. Within the wireless network configuration, there can be other wireless devices. In this example, the power output control device can function as the master device where all communications between the wireless devices or and all communications between the wireless devices and the wired network can go through the power output control device functioning an Access Point.

Accordingly, the power output control device can determine the location information such as the distance range location information and/or the geographic position location of each of the wireless devices by first transmitting signals such as UWB signals within the wireless network at a maximum or default range corresponding to a maximum or default power level, and subsequently receiving signals from the wireless devices. Once the location information of each of the wireless devices is determined, any communication between the power output control device and any one of the wireless device will be based on an adjusted power level. In other words, each wireless device within the wireless network will have initial location information associated therewith. Based on the location information, the power output control device can adjust the power output level in relation to each wireless device when transmitting a signal thereto. Similarly, the wireless device communicating with the power output control device can also adjust its power output level based on the communication protocol set by the communication link. For instance, if a wireless device is 5 meters away from the power output control device, device can control the power output corresponding to the 5 meters and transmit signals accordingly.

After an initial adjustment of the power output level is made based on an initial determination of the location information of a device, the transmission of signals between the power output control device and the wireless device can be set at the adjusted power output level, whereby the power output control device and the wireless device can continue to communicate with each other at the adjusted power output level. However, in order to optimize the control of power output, the power output control device can periodically readjust or refresh the power output level at step 325.

If the location information of a wireless device does not change during a communication session, then the power output control device can transmit signals to the wireless device at the same initial adjusted power level at step 335. However, because a wireless device can be mobile and that the location information of the wireless device can often change after the initial determination of the location information, the power output control device can readjust or refresh the power output level periodically to update the optimization of the power consumption.

In one example, the power output control device can readjust the power output level when the device receives and records an amount of errors over a predetermined threshold level within the signals received at step 330 of FIG. 3. In other words, suppose a power output control device has initially determined the location information a particular wireless device. And based on the location information determined, the power output control device has readjusted and set its power output level accordingly to optimize the power usage. The power output control device and the wireless device establish a communication session where communication signals are transmitted to and from one device to another at the initially set power output level. However, during the communication session, the wireless device moves 15 meters away from the power output control device. Thereafter, the power output control device starts to detect and record weak signal transmissions containing signal errors therein from the wireless device. Once the power output control device detects errors within the signal transmission, the power output control device initiates an error detecting algorithm to determine various information such as the type of errors, the possible causes of the errors and if the detected amount of errors equals to or exceeds a predetermined threshold level. If the result of the algorithm indicates that a readjustment is required, then the power output control device can re-determine the location information of the wireless device and based on the new location information of the wireless device, the power output control device can readjust and set the power output level accordingly.

In another example, the power output control device can also readjust the power output level when said device receives and records a strong transmission signal from a wireless device at step 330 of FIG. 3. This can generally occur when the power output level and the wireless device are transmitting signal to and from one another with a power output level significantly over and above the required amount. In other words, suppose a power output control device has initially determined the location information of a particular wireless device. And based on the determined location information, the power output control device has readjusted and set its power output level accordingly to optimize the power usage. The power output control device and the wireless device establish a communication session where communication signals are transmitted to and from one device to another at the initially set power output level. During this communication session, however, the wireless device moves 10 meters closer to the power output control device. Thereafter, the power output control device starts to detect and record a significant change in the signal transmissions from the wireless device. The power output control device is being "blasted" with strong transmissions signals from the wireless device. Once the power output control device detects such a condition, the power output control device can initiate a transmission signal over-strength algorithm to access the condition and gather information such as the frequency of the strong signals, the strength level of the signals, and whether the detected amount of signal level is over a predetermined threshold level. If the result of the algorithm indicates that a readjustment is appropriate, then the power output control device can re-determine the location information of the wireless device and based on the new location information of the wireless device, the power output control device can readjust and set the power output level accordingly.

In yet another example, the power output control device can refresh the power output level when a predetermined amount of time has lapsed at step 330. In other words, suppose a power output control device has initially determined the location information a particular wireless device. And based on the location information determined, the power output control device readjusted and set its power output level accordingly to optimize the power usage. The power output control device and the wireless device establish a communication session where communication signals are transmitted to and from one device to another at the initial set power output level. However, during the communication session, the wireless device relocates and changes it location information with respect to the power output control device. However, the relocation of the wireless device does not cause the power output control device to receive errors in the transmission signals nor does it cause the power output control device to receive strong levels of transmission signals. Thereafter, the power output control device of this example can automatically refresh its power output level after the passing of a predetermined amount of time. The power output control device can re-determine the location information of the wireless device and based the new location information of the wireless device, the power output control device can readjust and set the power output level accordingly.

It is noted that the power output control device of the examples above can initially transmit signals at a maximum or default power output level to determine the initial location information of and/or establish communication with the wireless devices. Thereafter, the power output control device can readjust and lower or raise the power output level to the appropriate level by fine tuning to adapt to the environment due to interferences and obstructions such as walls and objects. Also, the power output control device can be a master device and set the communication protocol with a slave wireless device, whereby the master device can control the slave device to also transmit at the adjusted optimal output level.

One embodiment illustrating the above examples can be implemented in an environment such as a business office environment. The business office environment of this example can be configured to have a wireless network infrastructure similar to the wireless network infrastructure as shown in FIG. 2. The wireless network infrastructure can, for example, be located in a business office space. The business office's wireless network can contain a power output control device functioning as a master device and as an Access Point. The power output control device can be connected to a wired LAN, such as the Ethernet LAN. In addition, the business office's wireless network can contain one or more wireless devices located within the wireless network. The power output control device can act as a master device since all communications between the wireless devices, or between the wireless devices and the wired network can go through the power output control device. In addition, the power output control device and the wireless device can contain a power control system therein.

Suppose for example, the power output control device along with the wireless devices within the business office's wireless network are activated. The power output control device thereafter determines the location information of each wireless device within the office space. Upon determining the location information of each wireless device, the power output control device can adjust the power output level with respect to the location information determined.

Further suppose for this example that user X is using wireless device X, user Y is using wireless device Y and user Z is using wireless device Z. Based on the initial determination of their location information, wireless device X is 5 meters away, wireless device Y is 10 meters away, and wireless device Z is 15 meters away. At some time during the day, users X, Y and Z initiate communications with the power output control device. Accordingly, the power output control device establishes a communication session with each of the wireless devices, and sets the communication protocol which can include setting the power output level. Thereafter, communication signals are transmitted to and from each wireless device X, Y, Z to the power output control device at their respective adjusted power level. It is noted that the power output control device can transmit signals in device-specific bursts. In other words, the power output control device can transmit a burst of signal at a power output level X for wireless device X, and can transmit a burst of signal at a power output level Y for wireless device Y right after.

Continuing with the example, suppose at some time during the communication sessions, user X takes wireless device X and moves to a new work location 8 meters away. Similarly, user Y and wireless device Y relocates to a work location 3 meters away, and user Z and wireless device Z moves 3 meters and are 12 meters away from the master device. After the relocation of the wireless devices X, Y, and Z, the master device detects frequent and significant amount of errors within the signals received from wireless device X. Also, the master device receives signals from wireless device Y having repeated strong signal level, but does not receive any changes in the signals received from wireless device Z.

The master device receives and records such conditions and thereby initiates the respective algorithms to determine if a readjusting of power output level is necessary.

Suppose for this example that the signals received and recorded from wireless devices X and Y are such that they trigger the power output control device to readjust the power output level by determining the new location information of the devices. Upon transmitting and receiving location information signals, the power control output device determines the new location information for wireless device X is 8 meters away rather than 5 meters away, and that wireless device Y is now 3 meters away rather than 10 meters away. Based on the new location information of wireless devices X and Y, the power output control device readjusts the power output level and sets them at the new level.

As for device Z, the power output control device can after the passing of a predetermined amount of time, refresh the power output level by determining new location information for wireless device Z.

Figure 4:
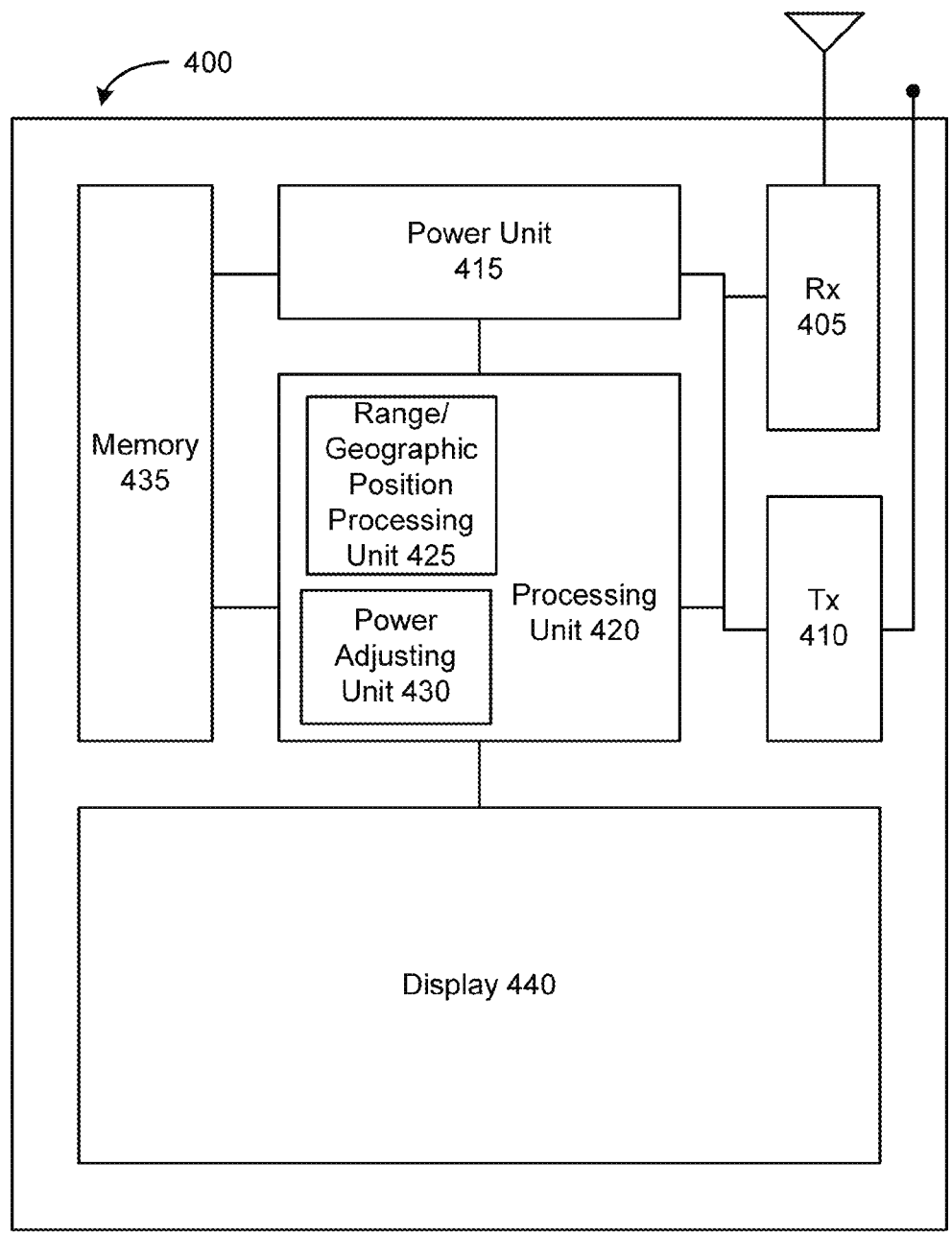
FIG. 4 illustrates one example of a hardware configuration for controlling power output based on signal-generated location information according to the present invention.

FIG. 4 illustrates one example of a hardware configuration that can determine the location information of wireless devices and control the power output level with respect to the determined location information, in accordance with an embodiment of the present invention. In addition, the hardware configuration of FIG. 4 can be in an integrated, modular and single chip solution, and therefore can be embodied on a semiconductor substrate, such as silicon. Alternatively, the hardware configuration of FIG. 4 can be a plurality of discrete components on a circuit board. The configuration can also be implemented as a general purpose device configured with software.

FIG. 4 illustrates a power output control device 400 configured to determine the location information of wireless devices, and adjusting the power output level with respect to the determined location information. The power output control device 400 contains a receiver 405 and a transmitter 410. The transmitter 410 can transmit electromagnetic signals as well as various other signals such as UWB signals. The transmitter 410 can transmit signals in short pulses in short duty cycles. In the alternative, the receiver 405 can receive electromagnetic signals as well as various other signals including UWB signals.

Furthermore, the power output control device 400 can include a power unit 415 and a memory 435. The power unit 415 can store and supply the power source to operated the power output control device 400. In other words, the power unit 415 can be a battery or a power packet housed in the power output control device 400. Furthermore, the memory 435 can store information such as geographic maps, algorithms to determine errors within the received signals, and algorithms to determine if the received signals is too strong, or can store default values and look-up table, etc.

FIG. 4 also shows a processing unit 420, and a range/geographic processing unit 425 for determining the location information of the wireless devices. It is noted that the range/geographic processing unit 425 can be separate processing units. It is further noted that although the range/geographic processing unit 425 is shown to be within the processing unit 420, the range/geographic processing unit 425 can be a separate and distinct processing unit from the processing unit 420.

Therefore, the processing unit 420 can be the main processing unit and can process functions that are outside the functions of the range/geographic processing unit 425. The range/geographic position processing unit 425 can therefore perform all the functions and tasks related to the determining of the location information of the available wireless devices. For instance, the range/geographic processing unit 425 can measure or calculate the period of time period from the time a first signal is transmitted to the time a second signal is received. Similarly, the range/geographic position processing unit 425 can perform all the functions and tasks related to the determining of the geographic position of the available wireless devices. These processing functions can include determining the geographic coordinates of the available wireless devices within the surrounding geographic environment of the power output control device 400.

Furthermore, FIG. 4 includes a power adjusting unit 430 and a display 440. The power adjusting unit 430 can process and determine information such as the error level of a received signal, the signal strength of a received signal, what output level corresponds to a particular location information, etc. The display 440 can be a plasma display, a LCD display or various other types of display for displaying multimedia information.

Figure 5:
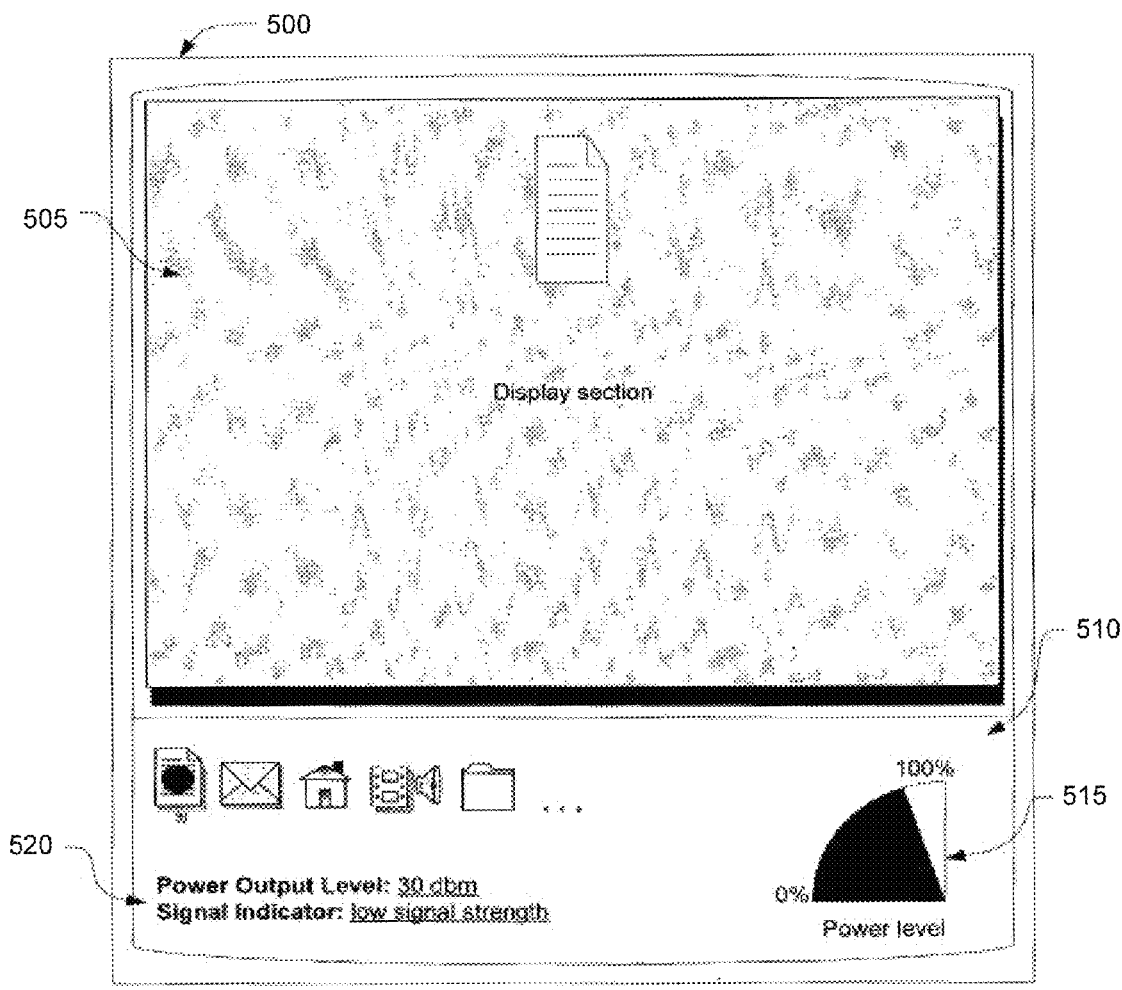
FIG. 5 illustrates one example of a display configuration for displaying information related power output according to the present invention.

FIG. 5 illustrates an example of the display format in accordance with an embodiment of the present invention. FIG. 5 illustrates an example of a display format 500 showing the power output level information along with various other information.

Main display area 505 of FIG. 5 can represent a main portion of the display 500 and can be used to display information related to a separate task running in tandem with the power output control device locator. For example, the main display area 505 can display a WWW web page if the user has accessed the Internet. In another example, the main display area 505 can display multimedia information from an e-mail received by the user.

Furthermore, display 500 of FIG. 5 can contain tools/information display area 510. This display area 510 can display icons and/or tools for accessing specific applications or functions. These icons can either be related to the power output control device or can be separate application modules unrelated to the device locator. For example, a user can access the e-mail feature by actuating a mail envelope or a similar icon, or the user can actuate the house icon to establish a connection with the Internet and access a home page.

The tools/information display area 510 can contain information related to power control such as a power level indicator 515, and the power output level and the signal strength indicator 520.

It is noted that, while various and multiple embodiments of methods for performing operations in accordance with various aspects of the invention have been presented for effectuating power optimization of wireless devices, these specific examples and embodiments are not exhaustive, and the principles described herein may be adapted to accommodate any desired configuration and manner of performing power optimization in accordance with a number of selectable principles (e.g., order, sequence, timing, cluster, signaling format, antenna configuration, etc.).

It is noted that the various modules, units, and/or circuitries (e.g., baseband processing modules, encoding modules and/or circuitries, decoding modules and/or circuitries, etc.) described herein may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The operational instructions may be stored in a memory. The memory may be a single memory device or a plurality of memory devices. Such a memory device may be a read-only memory (ROM), random access memory (RAM), volatile memory, non-volatile memory, static memory, dynamic memory, flash memory, and/or any device that stores digital information. It is also noted that when the processing module implements one or more of its functions via a state machine, analog circuitry, digital circuitry, and/or logic circuitry, the memory storing the corresponding operational instructions is embedded with the circuitry comprising the state machine, analog circuitry, digital circuitry, and/or logic circuitry. In such an embodiment, a memory stores, and a processing module coupled thereto executes, operational instructions corresponding to at least some of the steps and/or functions illustrated and/or described herein.

It is also noted that any of the connections or couplings between the various modules, circuits, functional blocks, components, devices, etc., within any of the various diagrams or as described herein may be differently implemented in different embodiments. For example, in one embodiment, such connections or couplings may be direct connections or direct couplings there between. In another embodiment, such connections or couplings may be indirect connections or indirect couplings there between (e.g., with one or more intervening components there between). Of course, certain other embodiments may have some combinations of such connections or couplings therein such that some of the connections or couplings are direct, while others are indirect. Different implementations may be employed for effectuating communicative coupling between modules, circuits, functional blocks, components, devices, etc. without departing from the scope and spirit of the invention.

As one of average skill in the art may appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art may further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art may also appreciate, inferred coupling (i.e., where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

Various aspects of the present invention have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Various aspects of the present invention have been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, various aspects of the present invention are not limited to such embodiments. One of average skill in the art will understand that various changes and modifications may be practiced within the spirit and scope of the invention, as limited only by the scope of the appended claims.

What is claimed is:

1. A method comprising:
    transmitting a signal at a maximum power output level by a first wireless mobile device to establish communication with a second wireless mobile device;
    upon establishing communication with the second wireless mobile device, determining a distance between the first wireless mobile device and the second wireless mobile device;
    adjusting a power output level of the first wireless mobile device from the maximum power output level, for transmitting the signal to the second wireless mobile device, to an adjusted power output level based on the distance between the first wireless mobile device and the second wireless mobile device; and
    periodically determining whether the signal between the first and the second wireless mobile devices has an amount of errors equal to or exceeding a predetermined error threshold;
    when the amount of errors are equal to or exceeding the predetermined error threshold:
        determining a subsequent distance between the first wireless mobile device and the second wireless mobile device; and
        readjusting the adjusted power output level of the first wireless mobile device, for transmitting the signal to the second wireless mobile device, to a readjusted power output level based at least in part on the subsequent distance to bring the amount of errors within the predetermined error threshold.

2. The method of claim 1, wherein the predetermined error threshold comprises an error amount of the signal over a predetermined period of time.

3. The method of claim 1, wherein the determining the distance further comprising:
    determining distance range information of the second wireless mobile device with respect to the first wireless mobile device; and
    determining geographic position information of the second wireless mobile device generated by a Global Positioning System.

4. The method of claim 1, wherein the first wireless mobile device functions as a master device configured to serve as an Access Point.

5. An apparatus for a wireless network, the apparatus comprising processing circuitry configured to:
    transmit a signal at a maximum power output level to establish communication with a wireless mobile device;
    upon establishing the communication with the wireless mobile device, determine a distance with the wireless mobile device;
    adjust a power output level, for transmitting a signal to the wireless mobile device, from the maximum power output level to an adjusted power output level based on the distance; and
    periodically determine whether the signal between the apparatus and the wireless mobile device has an amount of errors equal to or exceeding a predetermined error threshold;
    when the amount of errors are equal to or exceeding the predetermined error threshold:
        determine a subsequent distance between the apparatus and the wireless mobile device; and
        readjust the adjusted power output level to a readjusted power output level based at least in part on the subsequent distance to bring the amount of errors within the predetermined error threshold, wherein the readjusted power output level is over a required strength level by a predetermined threshold.

6. The apparatus of claim 5, wherein:
    the power output level of the wireless mobile device readjusted to the readjusted power output level further based at least in part on re-determining the distance the wireless mobile device.

7. The apparatus of claim 5, wherein:
    the adjusted power output level being readjusted to the readjusted power output level having a minimum strength level of the signal to the wireless mobile device.

8. The apparatus of claim 5, wherein the processing circuitry is further configured to determine the distance by:
    when a surrounding geographic environment is an immediate surrounding environment, transmit initial detecting pulse signals to detect at least one of an interior design and an interior layout.

9. The apparatus of claim 5, wherein the processing circuitry is further configured for transmitting the signal by:
    transmitting the signal in pulses at a predetermined power level.

10. The apparatus of claim 5, wherein the predetermined threshold comprises the strength level being over the required strength level over a predetermined period of time.

11. The apparatus of claim 5, wherein the predetermined error threshold comprises an error amount of at least one subsequent signal from the wireless mobile device.

12. The apparatus of claim 5, wherein the predetermined threshold comprises a power saturated signal level.

13. The apparatus of claim 5, wherein the processing circuitry is further configured to determine the distance by:
    determining distance range information of the wireless mobile device; and
    determining geographic position information of the wireless mobile device generated by a Global Positioning System.

14. The apparatus of claim 5, wherein the apparatus functions as a master device configured to serve as an Access Point.

15. The method of claim 1, wherein:
    the readjusting the power output level of the first wireless mobile device is further based at least in part on re-determining the distance between the first and the second wireless mobile devices.

16. The method of claim 1, wherein:
the readjusting the adjusted power output level of the first wireless mobile device is further based at least in part on a determining that a strength level of the signal is at a strength level that is over a required strength level by the predetermined error threshold.

17. A wireless mobile device comprising:
a processing module; and
memory coupled to the processing module, wherein the memory stores operational instructions that upon execution cause the processing module to:
 transmit a signal at a maximum power output level to establish communication with another wireless mobile device;
 upon establishing the communication with the another wireless mobile device via the signal, determine a distance with respect to the another wireless mobile device;
 adjust a power output level, for transmitting a signal to the another mobile wireless device, from the maximum power output level to an adjusted power output level based on the distance to the another mobile wireless device; and
 periodically determine whether the signal has an amount of errors equal to or exceeding a predetermined error threshold;
 when the amount of errors are equal to or exceeding the predetermined error threshold:
  determine a subsequent distance to the another wireless mobile device; and
  readjust the adjusted power output level to a readjusted power output level based at least in part on the subsequent distance to bring the amount of errors within the predetermined error threshold.

18. The wireless mobile device of claim 17, wherein the predetermined error threshold further comprises the amount of errors over a predetermined time period.

19. The wireless mobile device of claim 17, wherein the predetermined error threshold level further comprises a power saturated signal level of a signal transmission from the wireless mobile device.

20. The wireless mobile device of claim 17, wherein the memory further stores operational instructions that upon execution cause the processing module to determine the distance by:
 when a surrounding geographic environment is an immediate surrounding environment, transmit initial detecting pulse signals to detect at least one of an interior design and an interior layout.

* * * * *